Inventors
ERNST KARWAT
GUNTHER RUCKBORN

By Toulmin & Toulmin,
Attorneys

Inventors
ERNST KARWAT
GUNTHER RUCKBORN
By Toulmin & Toulmin
Attorneys 3,279,197
PROCESS OF ABSORBING HYDROCARBON IMPURITIES IN AIR SEPARATION
Ernst Karwat, Pullach im Isartal, and Gunther Ruckborn, Grunwald, near Munich, Germany, assignors to Linde Aktiengesellschaft
Filed Mar. 18, 1963, Ser. No. 265,686
Claims priority, application Germany, Mar. 20, 1962, G 34,527
1 Claim. (Cl. 62—13)

This invention relates to the low temperature fractionation of air, particularly to a system wherein the cooled air from the regenerators or the like is passed through an adsorption column for the removal of hydrocarbon impurities.

Atmospheric air in industrial areas usually contains minor amounts of hydrocarbon impurities such as acetylene, propylene and propane etc. If these impurities are not removed, they cause trouble during the low temperature fractionation of the air by accumulating in certain parts of the apparatus. A procedure for the removal of these hydrocarbons is to cool the gaseous air to a low temperature and to pass it over an adsorbent such as silica gel.

It has been found, however, that this method is not always a safe one, because the hydrocarbons are sometimes not removed but are carried to the fractionating column.

The object of this invention, therefore, is to provide a modified process for the fractionation of air which secures the complete removal of hydrocarbons in an adsorption column placed downstream of the regenerators.

Another object is to provide a novel process which combines adsorption of hydrocarbons and efficient heat exchange between fractionation products and air.

A further object is to provide novel apparatus in which the process of this invention can be efficiently realized.

Upon further study of the specification and appended claims, other objects and advantages of this invention will become apparent.

To attain the objects of this invention, the source of the trouble has been found, and the trouble now eliminated by a relatively simple procedure.

It is known that the cooled gaseous air is partially liquefied in the regenerators at the beginning of a cycle.

It was found that if such a liquid air is entrained as a mist in the gaseous air leaving the regenerators the hydrocarbons are actually washed from the adsorbent and carried to the fractionating column.

From this fact the conclusion was drawn that any liquefaction of air within the regenerators has to be prevented. This is effected by warming up the fractionation products before they enter the regenerators. Thereby it is achieved that the adsorption is performed at a temperature just above the temperature at which the air begins to condense.

Figure 1:
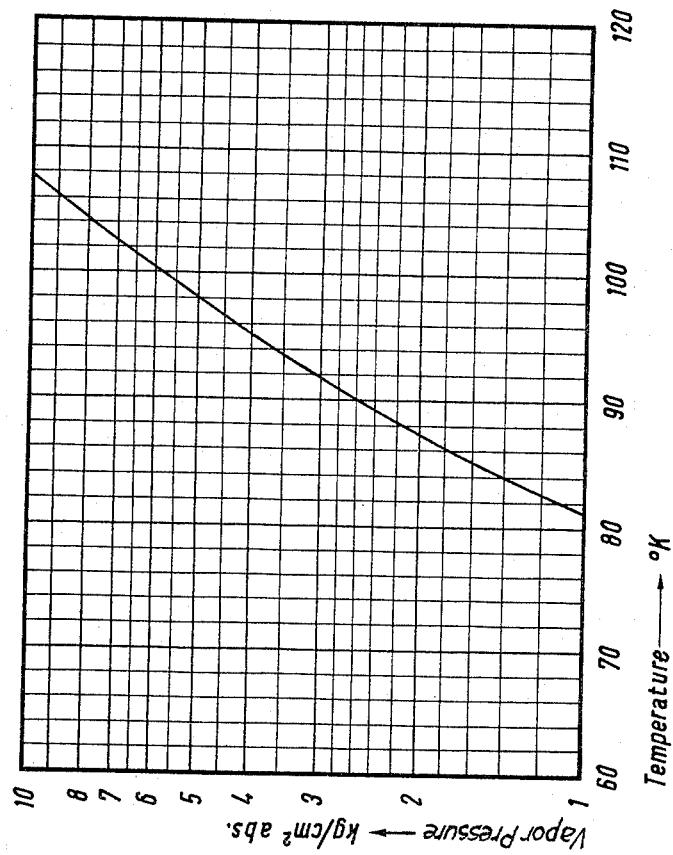
FIGURE 1 is a graph showing the temperature at which the air begins to condense, or incipient temperature, for pressures between 1 and 10 atmospheres absolute.

Referring now to FIGURE 1, which shows the incipient condensation temperature of air or the temperature at which air begins to condense depending on pressure. This is the temperature to which oxygen and nitrogen have to be approximately warmed up before entering the regenerators.

In a process, wherein the fractionated products are employed to cool the incoming air, it is necessary to warm said products before they enter the regenerator so that the temperature of the air within the regenerators will not drop below its dew point. For preheating these fractionation products, any method of heat exchange may be employed, particularly those that are common to air fractionation processes. It is a most important feature of the invention to utilize for this purpose the sensible heat and/or the latent heat of condensation of the air that emerges from the adsorber.

The method according to the invention of controlling the temperature of the air before entering the adsorber is to accomplish the warming up of the fractionation products before entering the regenerators by heat exchange with the air emerging from the adsorber. Preferably this heat exchange is performed in such a manner that the air emerging from the adsorber is cooled down below its incipient condensation temperature. Thereby the fractionation products emerging from the heat exchangers achieve a temperature which is just below the incipient condensation temperature of the air entering the regenerators according to the dimensioning of the exchangers and the degree of condensation and the air entering the regenerators is cooled to above the incipient condensation temperature.

Since nitrogen represents about 4/5 of the air, and since nitrogen is cooled to the lowest temperature in the fractionation process, about 78–80° K., it is apparent that the most serious heat exchange problem in an integrated system is to utilize the nitrogen refrigerant values efficiently. At the same time it is necessary to raise the temperature of the nitrogen, as a fractionated product, in accordance with the teachings of this invention. In this connection, it is particularly advantageous to employ a conventional double rectification column, and to pass the nitrogen product into the sump of the high pressure column in order to warm the nitrogen and refrigerate the liquid collected therein.

Without further elaboration, it is believed that one skilled in the art can employ this invention to its fullest extent. The following preferred mode of this invention is, therefore, merely exemplary and is not to be considered limitative as to the remainder of the specification and appended claims.

EXAMPLE 1

Figure 2:
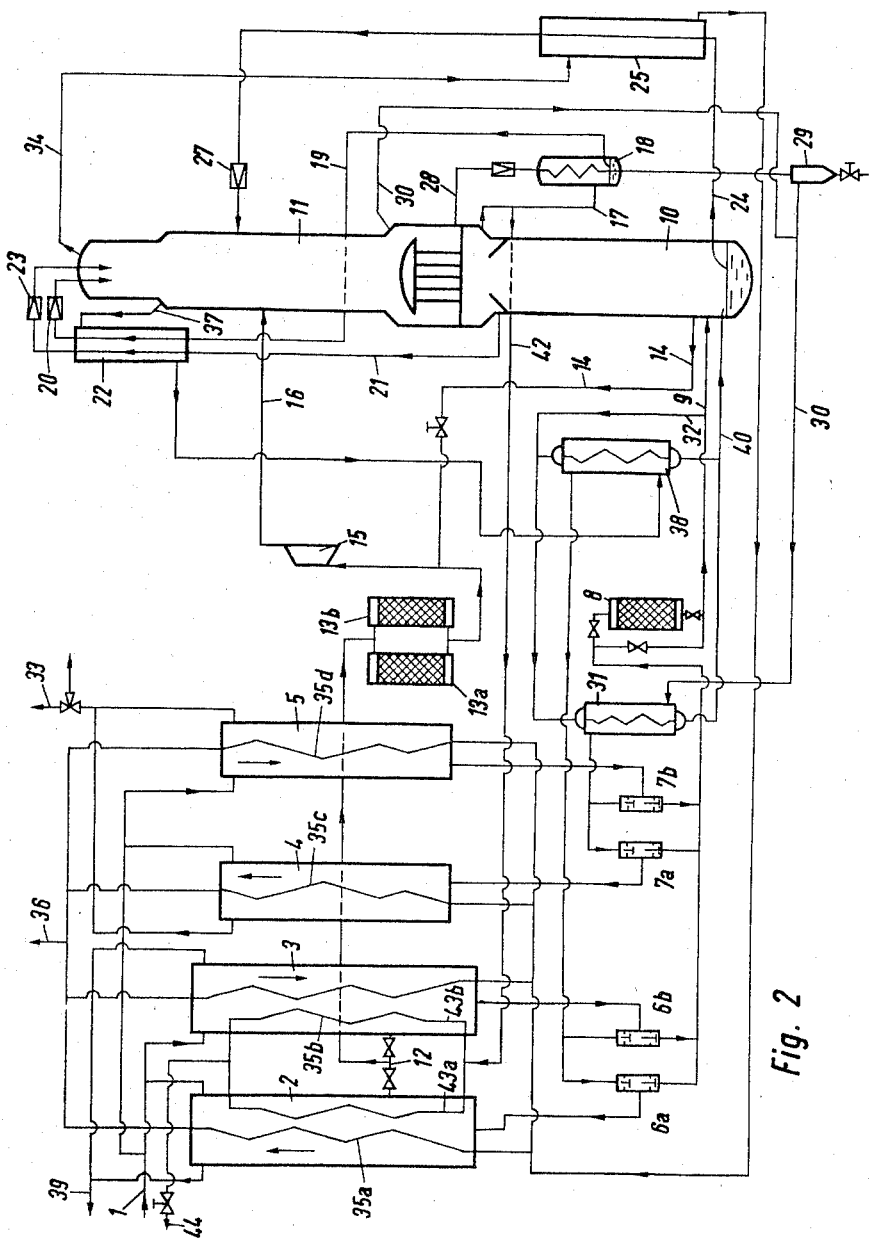
FIGURE 2 is a diagrammatic flowsheet of a preferred embodiment of this invention.

Referring to FIGURE 2, through conduit 1 are delivered about 24,000 cubic meters/hr. of air as measured at normal conditions under a pressure of about 6.2 atm. absolute and according to this invention cooled in regenerators 3 and 5 down to just above the initial condensation temperature, specifically. Carbon dioxide and water are thus separated. Regenerators 2 and 3 as well as regenerators 4 and 5 may be cyclically interchanged in a conventional manner by valves not shown.

The greater part of this air, about 20,000 cubic meters per hour at normal conditions after passing through check valves 6b and 7b is passed through the adsorber 8 containing absorbents such as silica gel which adsorbs the hydrocarbons. The greatest part of this air is then delivered by conduit 9 to the high pressure section 10 of a double rectification column. A portion of it is diverted from conduit 9 by conduit 32 to the heat exchangers 31 and 38 wherein said portion is liquefied. The resultant liquid is then passed through conduit 40 to the high pressure column 10.

A portion of the air, about 3400 cubic meters per hour as measured at normal conditions is taken from an intermediate point of regenerator 3 by conduit 12 for delivery to adsorbers 13a and 13b which can also be selectively interchanged for the removal of carbon dioxide and also of hydrocarbons if required. This purified air is mixed with 2600 cubic meters per hour of air as measured at normal conditions that is taken via conduit 14 from pressure column 10. The mixture is expanded by passage through turbine 15 and is blown into the low pressure portion 11 of the double rectification column through conduit 16.

In the high pressure column 10, the air is fractionated in a known manner into an oxygen rich liquid which collects in the bottom of the column, and pure nitrogen which collects in the head. About 4000 cubic meters per hour gaseous nitrogen as measured at normal conditions are removed from the head of column 10 by conduit 17 for delivery to the supplementary condenser 18 where it is condensed during heat exchange with the vaporizing oxygen which is obtained from the bottom of the low pressure column via conduit 28. The resultant liquid nitrogen is removed by conduit 19 for passage through heat exchanger 22 and through valve 20 for expansion into the head of low pressure column 11 as a reflux liquid. About 3400 cubic meters per hour of a liquid nitrogen as measured at normal conditions are removed by conduit 21 and are similarly cooled in heat exchanger 22 and after expansion in valve 23, are conducted into the head of low pressure column 11.

About 9900 cubic meters per hour as measured at normal conditions of the oxygen rich sump product from the high pressure column 10 are removed by conduit 24 and are delivered to heat exchanger 25 to be further cooled therein, and are then passed through valve 27 for expansion into low pressure column 11 for further fractionation therein. From the low pressure column 11, liquid oxygen is removed by conduit 28 for delivery to the supplementary condenser 18 where it is evaporated to a small liquid residue which is then removed through a separator 29. The gaseous fraction is added to the gaseous oxygen in conduit 30 which was taken from the low pressure column 11.

According to this invention all the gaseous oxygen is warmed in the heat exchanger 31 up to about 99.5° K. by a portion of the air to be fractionated, diverted in conduit 32 from conduit 9. The diverted portion is thereby cooled at least to incipient condensation at a pressure of 6.0 atm. while the oxygen has reached a temperature near the incipient condensation temperature of the air safeguarding against any condensation of air in the regenerator. At the same time the oxygen is conducted through check valve 7a to the regenerator 4 where it is warmed to room temperature. 3800 cubic meters per hour as measured at normal conditions of oxygen of 99% purity leave the apparatus through conduit 33. At the beginning of each period about 100 cubic meters per hour oxygen are blown off through conduit 33a for removing the impurities which have collected in the regenerator.

About 8500 cubic meters per hour as measured at normal conditions of pure nitrogen are removed by conduit 34 from the head of the low pressure column 11 and according to this invention are warmed in heat exchanger 25 to about 99° K. by heat exchange with the liquid arriving by conduit 24 from the high pressure column, said liquid being thereby cooled about 10°. The nitrogen is then warmed in the coils 35a–35d in regenerators 2–5 and is removed from the system by conduit 36.

About 11,000 cubic meters per hour as measured at normal conditions of impure nitrogen are withdrawn in conduit 37 from the low pressure column and passed to heat exchanger 22 where it is warmed to about 92° K. According to this invention this nitrogen is then conducted to heat exchanger 38 in which it is warmed to about 99.5° K. by counter-current heat exchange with the diverted air current from conduit 32, said air being partially liquefied thereby at a pressure of 6.0 atm. This temperature reached by the nitrogen is so near the incipient condensation temperature of the air that any condensation of air in the regenerator is prevented. At the same time the impure nitrogen is passed through valve 6a into regenerator 2 in which it is warmed to room temperature and is then released through conduit 39.

The air which has become liquefied in heat exchangers 31 and 38 during the warming up of the fractionation products is returned by conduit 40 to the sump of the high pressure column. By opening the valve 41 a small amount of liquid oxygen is occasionally drawn off from the separator and thus removed from the system.

The conduit 42 leading off from conduit 17 is connected with tubes 43a and 43b in regenerators 2 and 3. In these tubes a small amount of the high pressure nitrogen is warmed and can be drawn off through valve 44, to be used, for example, to recondition the adsorbers 8 and 13. These adsorbers are either provided in parallel pairs so that one of them can be reconditioned while the other is being used, or they can be disconnected completely by providing suitable shunts.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

A process for the low temperature fractionation of air containing hydrocarbon impurities comprising:

(a) cooling incoming air by heat exchange with products of fractionation whereby said incoming air is cooled to a temperature just above the incipient condensation temperature;

(b) adsorbing the hydrocarbon impurities from said incoming air and producing hydrocarbon free air;

(c) circulating said hydrocarbon free air in first, second and third portions;

(d) fractionating said first portion of said hydrocarbon free air in a double rectification column having a high pressure part and a low pressure part and producing an oxygen rich sump product from said high pressure part and pure nitrogen, impure nitrogen and oxygen fractions from said low pressure part;

(e) passing said pure nitrogen fraction from said low pressure part in heat exchange relationship with said oxygen rich sump product whereby said pure nitrogen fraction is heated to a temperature just below the incipient condensation temperature of air;

(f) passing said impure nitrogen fraction from said low pressure part in heat exchange relationship with said second portion of said hydrocarbon free air whereby said impure nitrogen fraction is heated to a temperature just below the incipient condensation temperature of air, and fractionating said second portion;

(g) passing at least one of said oxygen fractions in heat exchange relationship with said third portion of said hydrocarbon free air whereby said oxygen fraction is heated to a temperature just below the incipient condensation temperature of air, and fractionating said third portion; and (h) providing said cooled pure nitrogen fraction of (e), said heated impure nitrogen fraction of (f), and said heated oxygen fraction of (g) in heat exchange with said incoming air of (a) as said products of fractionation.

References Cited by the Examiner

UNITED STATES PATENTS

| | | | |
|---|---|---|---|
| 2,503,939 | 11/1950 | De Baufre | 62—18 X |
| 2,617,275 | 11/1952 | Goff | 62—18 X |
| 2,664,718 | 1/1954 | Rice | 62—14 |
| 2,777,299 | 1/1957 | Skaperdas | 62—15 X |
| 2,835,115 | 5/1958 | Karwat | 62—18 X |
| 2,840,994 | 7/1958 | Lobo | 62—18 X |
| 2,924,078 | 2/1960 | Tsunoda. | |
| 2,984,079 | 5/1961 | Matsch. | |

NORMAN YUDKOFF, *Primary Examiner.*